(12) United States Patent
O'Hara et al.

(10) Patent No.: US 11,785,042 B2
(45) Date of Patent: Oct. 10, 2023

(54) REAL TIME MANAGEMENT OF BOTNET ATTACKS

(71) Applicant: Arbor Networks, Inc., Westford, MA (US)

(72) Inventors: Sean O'Hara, Ypsilanti, MI (US); Andrew David Mortensen, Ann Arbor, MI (US); Brian St. Pierre, Acworth, NH (US)

(73) Assignee: Netscout Systems, Inc., Westford, MA (US)

( * ) Notice: Subject to any disclaimer, the term of this patent is extended or adjusted under 35 U.S.C. 154(b) by 712 days.

(21) Appl. No.: 16/528,153

(22) Filed: Jul. 31, 2019

(65) Prior Publication Data

US 2021/0037047 A1    Feb. 4, 2021

(51) Int. Cl.
*H04L 29/06* (2006.01)
*H04L 9/40* (2022.01)
(Continued)

(52) U.S. Cl.
CPC .......... *H04L 63/1458* (2013.01); *H04L 43/12* (2013.01); *H04L 61/4511* (2022.05);
(Continued)

(58) Field of Classification Search
CPC ............... H04L 29/12066; H04L 43/08; H04L 61/3025; H04L 63/20; H04L 63/1416;
(Continued)

(56) References Cited

U.S. PATENT DOCUMENTS 9,325,735 B1 * 4/2016 Xie ..................... H04L 63/1425
10,560,422 B2 * 2/2020 Pandrangi ........... H04L 67/2814
(Continued)

OTHER PUBLICATIONS

Bruneau, Guy; "DNS Sinkhole"; The SANS Institute; Information Security Reading Room; Oct. 7, 2010.
(Continued)

*Primary Examiner* — Dustin Nguyen
(74) *Attorney, Agent, or Firm* — Foley & Lardner LLP

(57) ABSTRACT

A system and computer-implemented method of managing botnet attacks to a computer network is provided. The system and method includes receiving a DNS request included in network traffic, each DNS request included in the network traffic and including a domain name of a target host and identifying a source address of a source host, wherein the translation of the domain name, if translated, provides an IP address to the source host that requested the translation. The domain name of the DNS request is compared to a botnet domain repository, wherein the botnet domain repository includes one or more entries, each entry having a confirmation indicator that indicates whether the entry corresponds to a confirmed botnet. If determined by the comparison that the domain name of the DNS request is included in the botnet domain repository, then the source address of the DNS request is stored or updated in an infected host repository and a control signal is output to cause any future network traffic from the source address to be diverted to an administrator configured address. Each source address stored in the infected host repository identifies a host known to be infected.

20 Claims, 6 Drawing Sheets

(51) Int. Cl.
*H04L 43/12* (2022.01)
*H04L 61/4511* (2022.01)
*H04L 61/5007* (2022.01)

(52) U.S. Cl.
CPC ...... *H04L 61/5007* (2022.05); *H04L 63/1416* (2013.01); *H04L 2463/143* (2013.01); *H04L 2463/144* (2013.01)

(58) Field of Classification Search
CPC . H04L 63/1425; H04L 63/1441; H04L 67/10; H04L 67/2814; H04L 63/168; G06N 3/02
See application file for complete search history.

(56) References Cited

U.S. PATENT DOCUMENTS

| | | | | |
|---|---|---|---|---|
| 10,652,260 | B1* | 5/2020 | Rodriguez | H04L 43/08 |
| 2008/0080518 | A1* | 4/2008 | Hoeflin | H04L 63/1425 370/395.42 |
| 2010/0037314 | A1* | 2/2010 | Perdisci | H04L 63/1416 709/217 |
| 2012/0054869 | A1* | 3/2012 | Yen | H04L 63/1441 709/245 |
| 2013/0174254 | A1* | 7/2013 | Gould | H04L 63/1441 726/22 |
| 2013/0232574 | A1* | 9/2013 | Carothers | H04L 63/1441 726/22 |
| 2014/0013434 | A1* | 1/2014 | Ranum | H04L 67/10 726/24 |
| 2014/0310811 | A1* | 10/2014 | Hentunen | H04L 63/1441 726/23 |
| 2015/0082431 | A1* | 3/2015 | Davis | H04L 63/1425 726/23 |
| 2015/0195291 | A1* | 7/2015 | Zuk | H04L 63/168 726/23 |
| 2017/0180312 | A1* | 6/2017 | Sullivan | H04L 61/3025 |
| 2019/0089718 | A1* | 3/2019 | Ranum | H04L 67/10 |
| 2019/0190931 | A1* | 6/2019 | Levin | H04L 63/20 |
| 2020/0396201 | A1* | 12/2020 | Du | G06N 3/02 |

OTHER PUBLICATIONS

DNS Response Policy Zones; https://dnsrpz.info/; visited Dec. 19, 2018.
Alehouse, J.B.; "Open Sourcing JA3, SSL/TLS Client Fingerprinting for Malware Detection"; https://engineering.salesforce.com/open-sourcing-ja3-92c9e53c3c41, visited Dec. 19, 2018.

* cited by examiner

REAL TIME MANAGEMENT OF BOTNET ATTACKS

FIELD OF THE INVENTION

The present technology relates to management of botnet attacks, and more particularly to real time management of botnet attacks orchestrated by command and control servers using domain names that are not yet known.

BACKGROUND

Domain Name Service (DNS) misuse has been addressed, such as by DNS Response Policy Zones (DNS RPZ), which distribute service policy through DNS mechanisms. Another method of combatting DNS misuse uses DNS sinkholes that build from DNS RPZ. Sinkholes operate by spoofing authoritative DNS servers for malicious domains. When IP address resolution of a malicious domain is requested, a non-routable or false IP address is returned, denying an infected host the ability to connect to a command and control server, which stops a botnet attack before it can start, and allows for notification or alerting of threats in real-time.

One vulnerability of methods that use DNS sinkholes is when an infected host, such as a botnet, is spoofed by a firewall or sinkhole and receives an error response, such as NXDOMAIN, in response to a DNS query, the infected host may retry with a new query that uses a newly selected domain name from a list maintained by the infected host of backup domain names. The selected domain name may not be known to be a malicious domain by an associated firewall or sinkhole at the time of the request. Firewalls and sinkholes receive updates, e.g., by reputation feeds or the like, with domain names that are known to be malicious. However, an infected host may request resolution of a new malicious domain name during operation at any time, before the new domain name can be circulated to firewalls or sinkholes. Thus, the malicious domain name is not yet known. This lack of intelligence by the firewalls or sinkholes can leave any network or computing device protected by a firewall or sinkhole vulnerable to an infected host that requests a new malicious domain name on the fly.

Such conventional methods and systems have generally been considered satisfactory for their intended purpose. However, there is still a need in the art for a method to manage botnet attacks in real time even when domain names are not yet known.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer network monitoring system of managing botnet attacks to a computer network is provided. The system includes a memory configured to store instructions and a processor disposed in communication with the memory, wherein the processor, upon execution of the instructions is configured to receive a DNS request included in network traffic, each DNS request included in the network traffic and including a domain name of a target host and identifying a source address of a source host. The translation of the domain name, if translated, provides an IP address to the source host that requested the translation. The domain name of the DNS request is compared to a botnet domain repository, wherein the botnet domain repository includes one or more entries, each entry having a confirmation indicator that indicates whether the entry corresponds to a confirmed botnet. If determined by the comparison that the domain name of the DNS request is included in the botnet domain repository, then the source address of the DNS request is stored or updated in an infected host repository and a control signal is output to cause any future network traffic from the source address to be diverted to an administrator configured address. Each source address stored in the infected host repository identifies a host known to be infected.

In accordance with still another aspect of the disclosure, a method of managing botnet attacks to a computer network is provided. The method includes receiving a DNS request included in network traffic, each DNS request included in the network traffic and including a domain name of a target host and identifying a source address of a source host. The translation of the domain name, if translated, provides an IP address to the source host that requested the translation. The domain name of the DNS request is compared to a botnet domain repository, wherein the botnet domain repository includes one or more entries, each entry having a confirmation indicator that indicates whether the entry corresponds to a confirmed botnet. If determined by the comparison that the domain name of the DNS request is included in the botnet domain repository, then the source address of the DNS request is stored or updated in an infected host repository and a control signal is output to cause any future network traffic from the source address to be diverted to an administrator configured address. Each source address stored in the infected host repository identifies a host known to be infected.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1A:
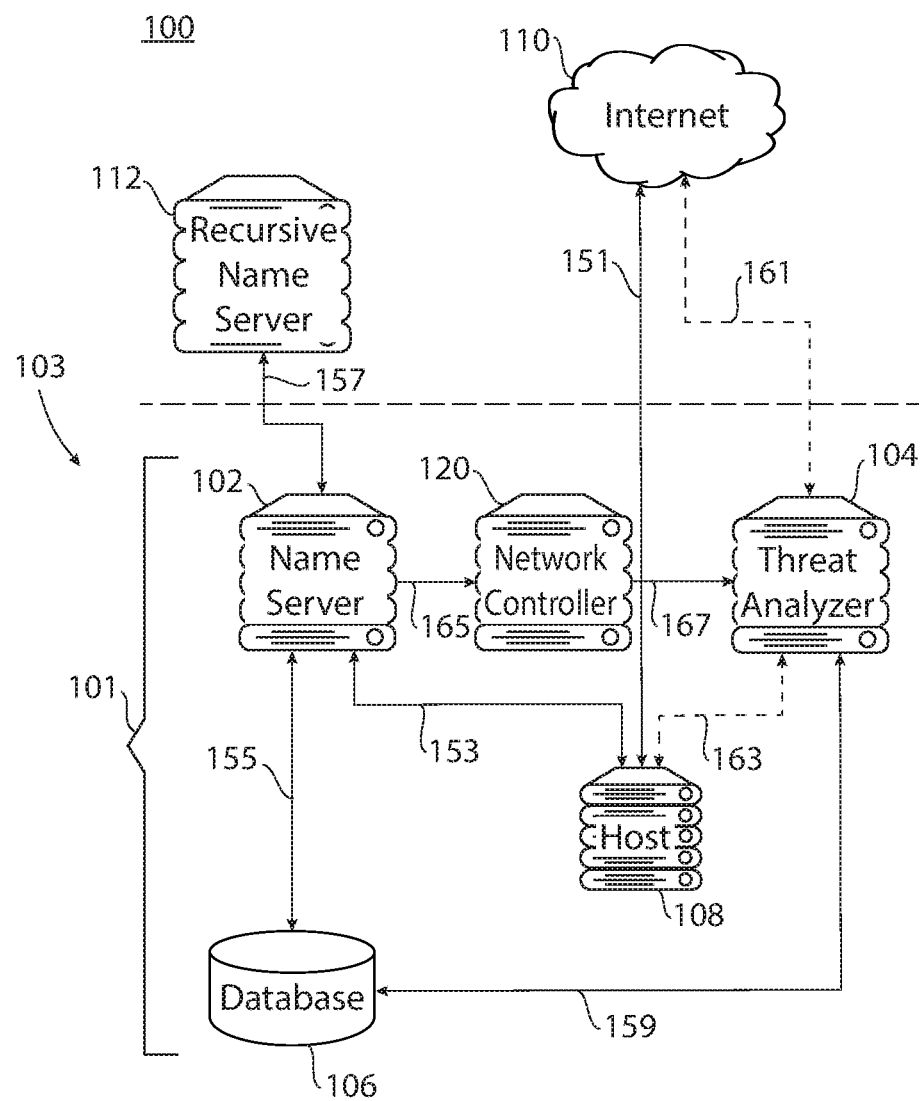
FIGS. 1A and 1B illustrate a block diagram of an example network system that includes a monitoring system for managing botnets operating in first and second respective modes, in accordance with an illustrative embodiment of the present disclosure.

A method and system is disclosed that in addition to using Domain Name Service (DNS) Response Policy Zones (RPZ)

methods to distribute DNS request policies, detects and mitigates attacks by rerouting traffic from infected hosts through a threat analyzer once a request is made for a domain already known to be malicious. The system uses a name server, a threat analyzer, and a network controller, which cooperate to share information and reroute traffic.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Figure 1B:
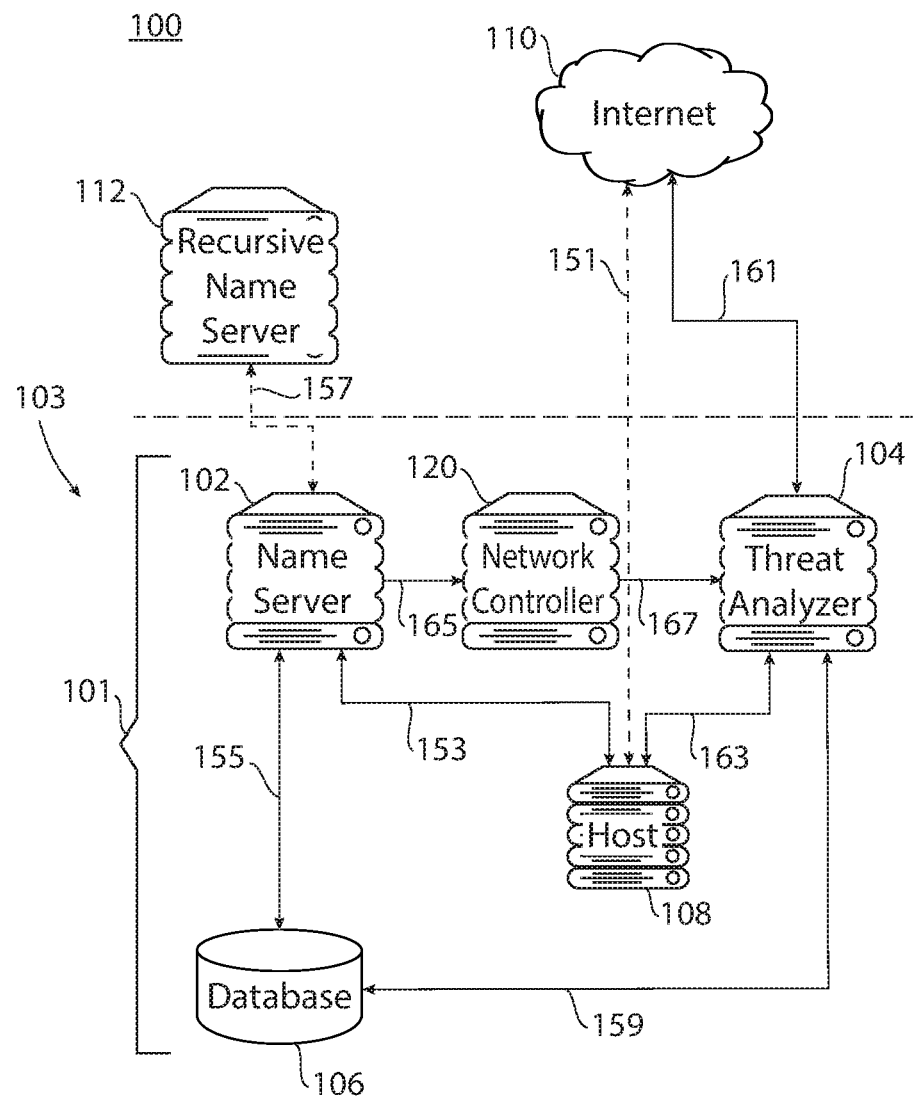

Description of certain illustrated embodiments of the present disclosure will now be provided. With reference now to FIGS. 1A and 1B, network system 100 includes a monitoring system 101. In the example shown, the monitoring system monitors a protected network 103, however the disclosure is not limited to monitoring a particular network, and can monitor a public network as well, such as a network provided by a service provider.

The monitoring system 101 includes a name server 102, a threat analyzer 104, a database 106, and a network controller 120 configured for processing DNS requests received from a protected host 108 of the protected network 103. The protected network 103 can include a plurality of protected hosts 108 and a plurality of name servers 102 and/or threat analyzers 104.

In the example shown, the protected network 103 is disposed below the horizontal dotted line. The protected network 103 can be provided at a single geographic location or can be distributed among multiple geographic locations that can be remote from one another. Examples of protected networks include corporations that have multiple corporate offices, a university that can have multiple buildings and/or campuses, or a home network. The protected network can include, for example, a local access network (LAN), a wide area network (WAN), and/or a VPN.

The name server 102, threat analyzer 104, and network controller 120 can be individual servers or can be modules of a single server. The server(s) can be a physical server or a virtual server that operates on a physical machine at a remote location. The name server 102, threat analyzer 104, and network controller 120 can be disposed at the same physical location or can be remote from one another. Each of the name server 102, threat analyzer 104, and network controller 120 can be provided within the protected network 103, at the edge of the protected network 103, in public networks, and/or can be deployed as a cloud-based server accessible via a public network, such as the Internet, or a private network.

The network system 100 further includes an external network that is unprotected by the monitoring system 101, wherein the external network can include one or more networks, such as the Internet 110 and a recursive name server 112. The recursive name server 112 is configured to receive DNS requests, each DNS request including a domain name for which an IP address is being requested, and a source address from which the DNS request was submitted. The translation of the domain name, if translated, provides an IP address. The recursive name server 112 responds to a received DNS request for an IP address by providing the corresponding IP address to protected host 108.

Figure 2:
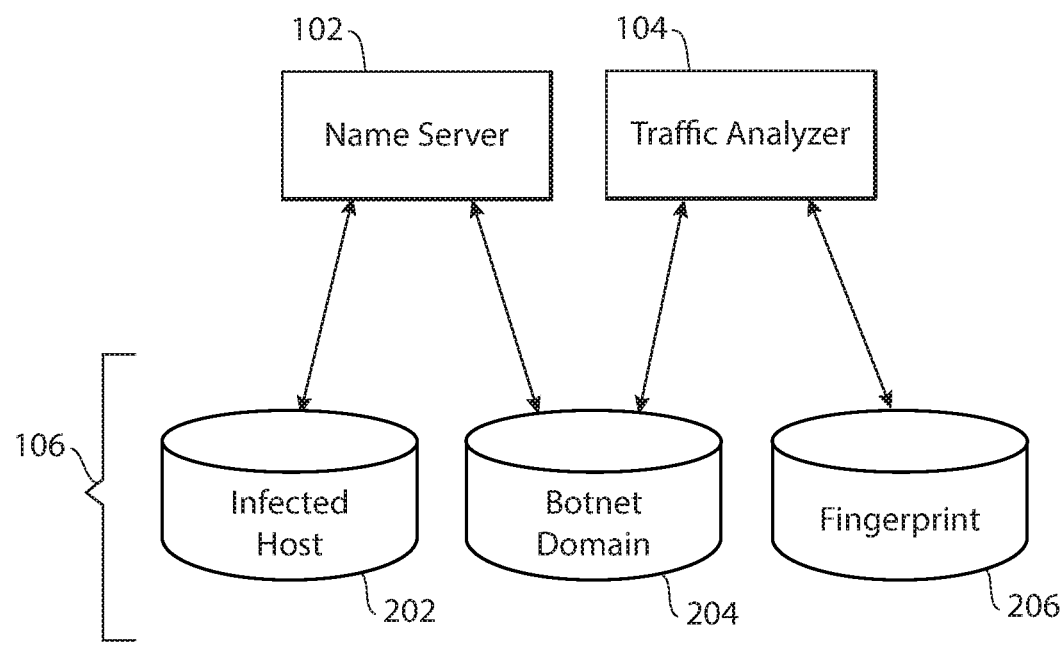
FIG. 2 illustrates a block diagram of a database of the monitoring system and the database's communication with the monitoring system.

As shown in FIG. 2, the database 106 includes botnet domain repository 204 and infected host repository 202. The botnet domain repository 204 stores names of domains that are suspected or confirmed names of botnets. Each domain entry in the botnet domain repository 204 can have a confirmation field that indicates whether the entry is confirmed or is still only suspected and is tentatively recorded in the repository.

The infected host repository 202 stores addresses of hosts that are known to be infected due to the hosts sending a DNS request analyzed by the name server 102, wherein the DNS request uses a domain in its source address that is included in the botnet domain repository 204. The database 106 further includes a fingerprint repository 206 which stores fingerprints of certain DNS requests. The fingerprint repository 206 is consulted to determine whether or not to confirm or remove entries in the botnet domain repository 204 that were marked as only suspected.

With reference to FIG. 1A and FIG. 2, a method performed by the name server 102 is shown, with the threat analyzer 104 and the communication paths 161 and 163 that are not in active use for the method performed by the name server 102 shown in gray and dotted lines, respectively. In operation, the name server 102 handles requests by checking the requests against a botnet domain repository 204. The protected host 108 can submit a DNS request to the name server 102, as indicated by path 153 in a first direction toward the name server 102. The name server 102 can process the DNS request, and based on a result of the analysis, which includes consulting the database 106, as shown by path 155 in a first direction towards the database 106, updates the botnet domain repository 204 and/or an infected host repository 202 of database 106 (shown in FIG. 2), as shown by path 155 in the other (a second) direction.

In particular, if the name server 102 determines that the domain name of the DNS request is included in an entry of the botnet domain repository 204, then the name server 102 performs steps (a)-(c). In step (a), the name server 102 determines the source address included in the DNS request and sends a control signal via path 165 to network controller 120 to cause the network controller 120 to divert future network traffic along path 151 monitored by the network controller that include the source address. The diversion is to an administrator configured address, which in the example shown is the threat analyzer 104. Accordingly, the network controller 120 will divert all network traffic that it determines include the host 108 in the source or destination address via path 167 to the threat analyzer. This will cause all network traffic from an external or internal host associated with the host 108 to send any future network traffic to the administrator configured address.

In step (b) the infected host repository 202 is updated (as shown by path 155 in the second direction) to include the source address or to update a timestamp of an entry of the infected host repository 202 for the source address to show that the source address was recently seen in a DNS request. Since the infected host repository is periodically cleaned of stale entries that include source addresses that have not been seen in received DNS requests for a predetermined threshold interval of time, updating the timestamp insures that the entry will not be removed during an infected host repository cleaning procedure.

In step (c) the name server 102 accepts the DNS request and returns a response using the address of the threat analyzer 104 as the resolved address. The effect of step (c) is to cause the source host of the DNS request to send network traffic to the address of the threat analyzer 104, which causes the threat analyzer 104 to create and store a fingerprint of the network traffic it receives in an entry of the fingerprint repository 206. This fingerprint will be used by the threat analyzer 104 the next time a comparison is performed of fingerprints stored in the fingerprint repository 206, as described further below with respect to FIGS. 1B and 4.

On the other hand, if the name server 102 determined, by the comparison, that the domain name included in the DNS request is not included in the botnet domain repository 204, then in a second comparison a determination is made whether the source address included in the DNS request is included in the infected host repository 202. If it is determined that the source address of the DNS request is included in the infected host repository 202, then the domain included in the DNS request is tentatively stored in the botnet domain repository 204 having an associated confirmation indicator set to indicate that the source address is not confirmed, meaning it is a potential botnet domain that until now was not known to be associated with a botnet. The DNS request is not dropped at this stage, but is allowed to be handled for further processing as intended, such as by the recursive name server 112, as indicated by path 157. The recursive name server 112 can then resolve the domain name by determining a resolved address. The resolved address can then be supplied in the reply to the requesting host 108, as in typical operation by a DNS resolver.

If it is determined that the source address of the DNS request is not included in the infected host repository 202, then the DNS request is handled by the recursive name server 112, as indicated by path 157, in order that the domain name can be resolved, as in typical operation by a DNS resolver.

With reference to FIG. 1B and FIG. 2, a method performed by the threat analyzer 104 is shown, with the name server 102 and the communication paths 153 and 157 that are not in active use for the method performed by the threat analyzer 104 shown in gray and dotted lines, respectively. In operation, the threat analyzer 104 checks incoming network traffic provided via paths 161 and 163 for their destination.

Upon a determination that the destination of the network traffic is the threat analyzer 104 itself (i.e., due the name server 102 performing step (c)), the threat analyzer 104 creates a baseline fingerprint for the network traffic and stores the fingerprint in the fingerprint repository 206, as indicated by path 159 in the direction towards database 106. Creating the fingerprints can include using a hash function, e.g., a cryptographic hash, such as MD5™, SHA™ or DSA™, without limitation to a particular fingerprint generation technique. After generating fingerprints, the threat analyzer 104 drops the traffic so that any malicious traffic is not sent from an infected host 108 towards the Internet 110.

Upon a determination that the destination is not the threat analyzer 104, the threat analyzer 104 creates a baseline fingerprint for the request using the same hash function and compares the newly created baseline fingerprint to baseline fingerprints stored in the fingerprint repository 206, as indicated by path 159 in the direction towards database 106.

Upon finding a match in the fingerprint repository 206, the threat analyzer 104 updates the infected host repository 202 by setting the associated confirmation indicator to indicate that the address of the host 108 is confirmed, meaning it is now a confirmed infected host. In this way, an infected host that is not yet known to be associated with a botnet can be confirmed in real time as being associated with a botnet, even when the infected host has not attempted to resolve any known botnet domains. The threat analyzer 104 then drops the network traffic, so that no malicious traffic is sent from the infected host 108 towards the Internet 110.

Upon determining that there is not a match in the fingerprint repository 206, the threat analyzer 104 forwards the network traffic towards its intended destination.

Figure 3:
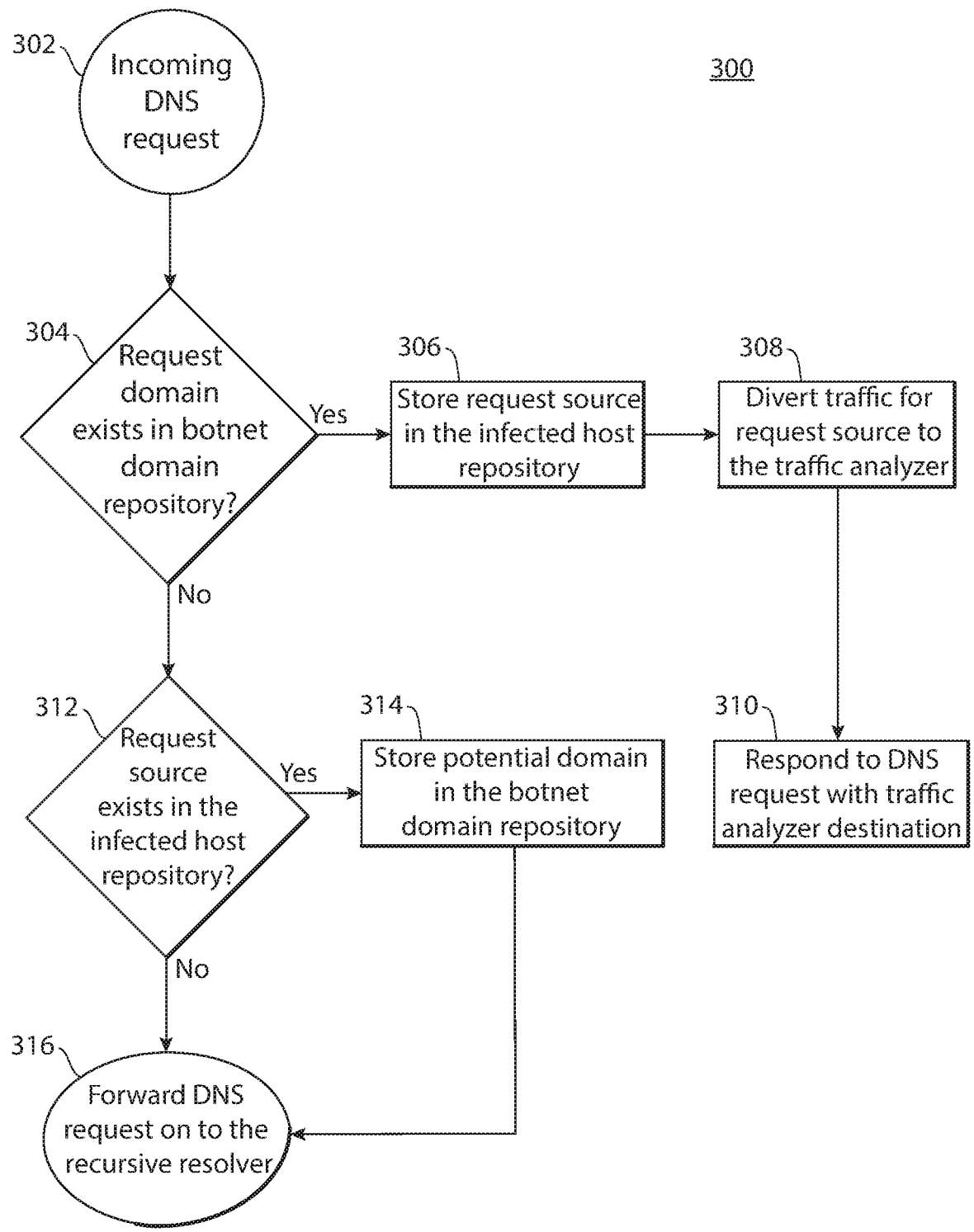
FIG. 3 illustrates a flowchart showing an example method performed by a name server of the monitoring system of FIG. 1 in accordance with embodiments of the disclosure.
Figure 4:
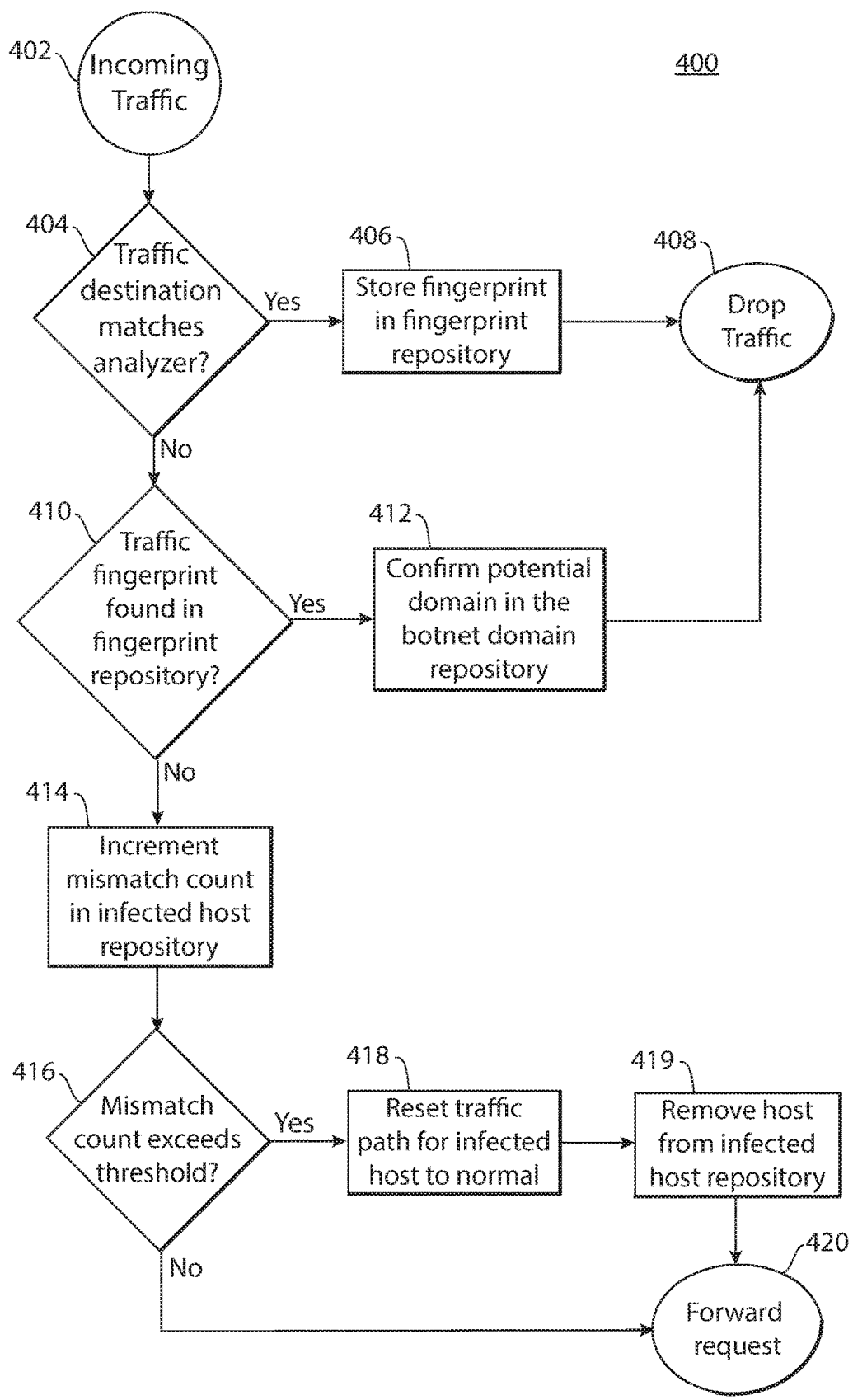
FIG. 4 illustrates a flowchart showing an example method performed by a threat analyzer of the monitoring system of FIG. 1 in accordance with embodiments of the disclosure.

With reference now to FIGS. 3 and 4, shown are flowcharts demonstrating implementation of the various exemplary embodiments. It is noted that the order of operations shown in FIGS. 3 and 4 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 3 illustrates operations of an example method performed by a name server, such as name server 102 shown in FIG. 1. At operation 302, an incoming DNS request is received. The DNS request includes a domain name of a target host and identifies a source address of a source host, wherein the translation of the domain name, if translated, provides a destination address for the source host to send further network traffic. At operation 304, a determination is made whether the domain name included with the DNS request is included in a botnet domain repository, such as botnet domain repository 204. If the determination is YES, meaning that the domain name translated from the DNS request is included in the botnet domain repository (indicating that the domain name is indicated as being associated with a botnet), then the method continues at operation 306.

At operation 306, the source address included with the DNS request is treated as an infected host and stored in an infected host repository, such as infected host repository 202. Thus, future network traffic having the same source address can be detected as being associated with a botnet by consulting the infected host repository 202, even if the network traffic is other than a DNS request or otherwise does not contain indicators that it is associated with a botnet.

At operation 308, the name server 102 diverts all future traffic for the source address to the threat analyzer 104 by sending a control signal to a network controller, such as network controller 120, to cause the network controller 120 to divert future network traffic monitored by the network controller that includes the address of the infected host, regardless of whether the threat analyzer 104 is the destination of the traffic or not.

At operation 310, a reply is sent to the source host in response to the DNS request using the address of the threat analyzer 104 as the resolved address. The effect of operation 310 is to cause the source host of the DNS request to send future network traffic for the intended domain name to the address of the threat analyzer.

If the determination at operation 304 is NO, meaning that the domain name translated from the DNS request is not included in the botnet domain repository, then the method continues at operation 312. At operation 312, a determination is made whether the source address included in the DNS request is already included in the infected host repository. If the determination at operation 312 is YES, meaning the DNS request's source address was found in the infected host repository, the method continues at operation 314. At operation 314, the DNS request's domain name is stored in the botnet domain repository with the associated confirmation indicator set to "potential," meaning the DNS request's domain name is under suspicion of being included in a botnet, but not confirmed as such. The method continues at operation 316.

If the determination at operation 312 is NO, meaning the DNS request's source address was not found in the infected host repository, the method continues at operation 316. At operation 316, the DNS request is provided to a recursive name server, such as recursive name server 112. The recursive name server 112 resolves the domain name by determining a resolved address and replying to the source with the resolved address.

FIG. 4 illustrates operations of an example method performed by a threat analyzer, such as threat analyzer 104 shown in FIG. 2. At operation 402, incoming network traffic is received. At operation 404, the threat analyzer determines whether the destination of the network traffic matches the address of the threat analyzer 104. If the determination at operation 404 is YES, meaning the destination of the network traffic matches the address of the threat analyzer 104 because the network traffic was diverted at operation 310, the method continues at operation 406.

At operation 406, a fingerprint of the network traffic is created, such as by using a hash function, and the fingerprint is stored in a fingerprint repository, such as fingerprint repository 206, shown in FIG. 2. At operation 408, the network traffic is dropped.

If the determination at operation 404 is NO, meaning the destination of the network traffic does not match the address of the threat analyzer 104, the method continues at operation 410. At operation 410, a fingerprint of the network traffic is created using the same method, e.g., hash function, and is then compared to the fingerprints stored in the fingerprint repository to determine whether a match can be found.

If the determination at operation 410 is YES, meaning a matching fingerprint was found, then the confirmation indicator of an entry in the botnet domain repository that matches the request's domain name is updated, e.g., form "potential," to "confirmed," meaning the suspected stored domain name that was under suspicion of being included in a botnet is now confirmed as belonging to a botnet. The method then continues at operation 408, at which a path associated with the request is allowed to timeout so that no further processing is performed on the request.

If the determination at operation 410 is NO, meaning a matching fingerprint was not found, then a fingerprint-mismatch counter for this infected host is incremented in the infected host repository, and the method continues at operation 416.

At operation 416, the fingerprint-mismatch counter for this host in the infected host repository is checked against an administrator provided threshold. If the fingerprint-mismatch counter exceeds the threshold, meaning that this host has sent traffic that has a fingerprint that is not found in the fingerprint repository more often than the threshold specified by the administrator, then the determination of this step is YES and the method proceeds with operation 418.

If the determination at operation 416 is NO, then the method proceeds with operation 420.

At operation 418, the traffic path for the infected host is reset to normal flow, so that the infected host's traffic no longer passes through the traffic analyzer. The combined effect of operations 414, 416, and 418 is such that only the first several portions of network traffic from a newly detected infected host are sent through the traffic analyzer and fingerprinted. The method then proceeds with operation 419.

At operation 419, the host is removed from the infected host repository. This periodically clears a host's status. As examples, an IP address in use by an infected host may be released and reused by a non-infected host, or an infected host may have the malicious software removed so that it is no longer infected. The method then proceeds with operation 420.

At operation 420, the network traffic is forwarded as intended.

Accordingly, in contrast with botnet management solutions that depend on using firewalls and/or sinkholes but are vulnerable to botnets that use new domain names from backup lists unknown to the firewall or sinkhole at the time, the method of the present disclosure uses cooperation between a name server, a threat analyzer and a network controller with access to repositories for domain names, infected hosts, and fingerprints of DNS requests to detect, including in real time, new domain names used that are not net known and thwart DNS requests that are associated with confirmed botnets without thwarting other network traffic.

The disclosed network monitor system can be configured as a stand-alone product or may be integrated into a larger system. In addition, the disclosed network monitor system can be configured as a stand-alone product or can be integrated with a public, private, or hybrid network to provide protection from botnets.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments processing performed by the name server 102, threat analyzer 104, and/or network controller 120 may be implemented or executed by one or more computer systems. For example, processing performed by the name server 102, threat analyzer 104, and/or network controller 120 can be implemented using a computer system such as example computer system 500 illustrated in FIG. 5. In various embodiments, computer system 500 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types. Computer system 500 may be practiced in distributed data processing environments where tasks are performed by remote processing devices that are linked through a communications network. In a distributed data processing environment, program modules may be located in both local and remote computer system storage media including memory storage devices.

Figure 5:
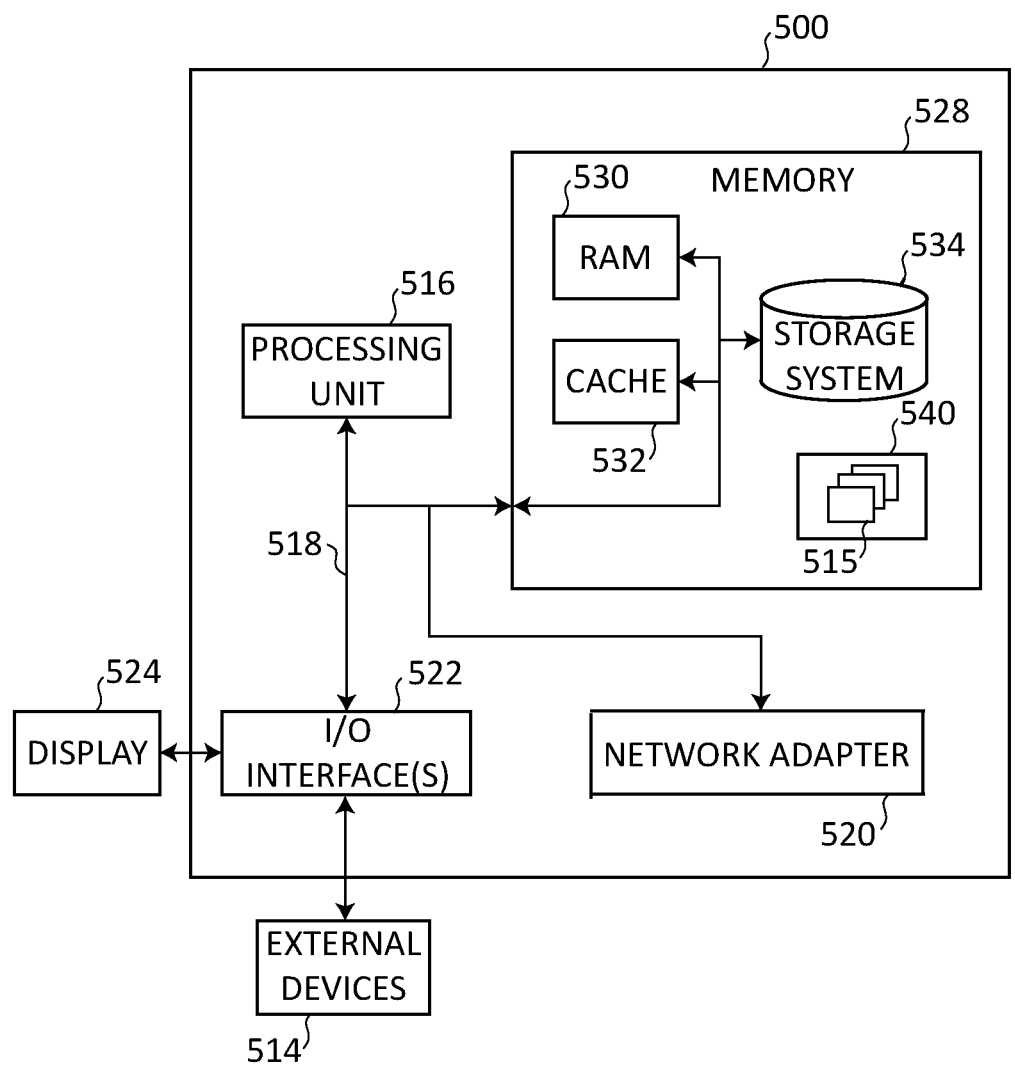
FIG. 5 illustrates a block diagram of an example computer system for implementing the name server, threat analyzer and/or a network controller of the monitoring system of FIG. 1 in accordance with an illustrative embodiment of the present disclosure.

Computer system 500 is shown in FIG. 5 in the form of a general-purpose computing device. The components of computer system 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 500 typically includes a variety of computer system readable media. Such media may be any available media that is accessible by the name server 102, threat analyzer 104, and/or network controller 120, and it includes both volatile and non-volatile media, removable and non-removable media.

System memory 528 can include computer system readable media in the form of volatile memory, such as random access memory (RAM) 530 and/or cache memory 532. Computer system 500 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515 may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 500 may also communicate with one or more external devices 514 such as a keyboard, a pointing device, a display 524, etc.; one or more devices that enable a user to interact with computer system 500; and/or any devices (e.g., network card, modem, etc.) that enable the name server 102, threat analyzer 104, and/or network controller 120 to communicate with one or more other computing devices. Such communication can occur via Input/Output (I/O) interfaces 522. Still yet, computer system 500 can communicate with one or more networks such as a local area network (LAN), a general wide area network (WAN), and/or a public network (e.g., the Internet) via network adapter 520. As depicted, network adapter 520 communicates with the other components of the name server 102, threat analyzer 104, and/or network controller 120 via bus 518. It should be understood that although not shown, other hardware and/or software components could be used in conjunction with computer system 500. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to mitigate and provide alerts in real time from infected hosts that frequently change their domain names, as opposed to waiting for updated reputation feeds about newly recognized malicious domain names. The disclosed monitoring system is versatile, such that it can integrated with an existing monitoring system or provided as a standalone system, either of which can be deployed locally or cloud-based.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer network monitoring system for monitoring a protected computer network for managing botnet attacks from within the protected computer network, the computer network monitoring system comprising a name server, the name server comprising:
    a memory configured to store instructions;
    a processor disposed in communication with the memory, wherein the processor, upon execution of the instructions is configured to:
        receive a DNS request included in network traffic internal to the protected computer network from a source host included in the protected computer network, each DNS request included in the network traffic including a domain name of a target host and identifying a source address of the source host, wherein translation of the domain name provides an IP address of the source host;
        compare the domain name of the DNS request to a botnet domain repository, the botnet domain repository including one or more entries, each entry having a confirmation indicator set to confirmed to indicate that the entry is confirmed or set to tentative to indicate that the entry is tentative;
        if determined by the comparison that the domain name of the DNS request is included in the botnet domain repository, then:
            store or update the source address of the DNS request in an infected host repository, wherein each source address stored in the infected host repository identifies a host known to be infected; and
            output a control signal to a network controller to cause the network controller to cause any future network traffic to or from the source address to be diverted to an administrator configured address;
        if determined by the comparison that the domain name is not included in the botnet domain repository, then determine by a second comparison whether the source address of the DNS request is included in the infected host repository; and
        if determined by the second comparison that the source address of the DNS request is included in the infected host repository, then store the domain of the DNS request in the botnet domain repository having an associated confirmation indicator set to indicate that the source address is tentative, after which the DNS request is allowed to be handled for further processing as intended by the DNS request.

2. The computer network monitoring system of claim 1, wherein if determined by the comparison that the domain name of the DNS request is included in the botnet domain repository, then the processor, upon execution of the instructions is further configured to send a DNS response to the DNS request indicating an administrator configured address which will cause the source host to send future network traffic to the administrator configured address by using the administrator configured address as the destination address of the future network traffic.

3. The computer network monitoring system of claim 1, wherein the processor, upon execution of the instructions is further configured to, if determined by the second comparison that the source address is not included in the infected host repository, then allow the DNS request to be handled for the further processing as intended by the DNS request.

4. The computer network monitoring system of claim 3, wherein allowing the DNS request to be handled for further processing includes forwarding the first DNS request to a recursive resolver.

5. The computer network monitoring system of claim 2, further comprising a threat manager, the threat manager comprising:
    a second memory configured to store instructions;
    a second processor disposed in communication with the second memory, wherein the second processor, upon execution of the instructions is configured to:

when a portion of the future network traffic is received at the administrator configured address due to the destination address of the portion of the future network traffic being the administrator configured address:
  cause generation of a fingerprint of the portion of the future network traffic; and
  cause the fingerprint to be recorded in a fingerprint repository and the portion of the future network traffic to be dropped.

6. The computer network monitoring system of claim 5, wherein when a portion of the network traffic or the future network traffic is received at the administrator configured address due to a diversion to the administrator configured address, the second processor upon execution of the instructions is further configured to cause to be processed any tentative entry in the botnet domain repository that corresponds to the portion of the network traffic or the future network traffic diverted to the administrator as a function of a fingerprint of the portion of the network traffic or future network traffic.

7. The computer network monitoring system of claim 6, wherein when the fingerprint of the portion of the network traffic or the future network traffic diverted to the administrator configured address matches a fingerprint of network traffic that is recorded in the fingerprint repository, causing processing of the corresponding tentative entry in the botnet domain repository includes causing the confirmation indicator of the corresponding tentative entry to be changed from tentative to confirmed.

8. The computer network monitoring system of claim 7, wherein the second processor is further configured to cause the portion of the network traffic or the future network traffic diverted to the administrator configured address to be dropped.

9. The computer network monitoring system of claim 6, wherein when the fingerprint of the portion of the network traffic or the future network traffic diverted to the administrator configured address does not match fingerprints of network traffic that are recorded in the fingerprint repository a predetermined amount of times, causing the tentative entry in the botnet domain repository to be processed includes causing removal of the corresponding tentative entry from the botnet domain repository, and causing the portion of the network traffic or the future network traffic diverted to the administrator configured address to be handled for further processing as intended by the respective request or future request.

10. The computer network monitoring system of claim 1, wherein the infected host repository is updated periodically to remove each source address that is stale due to nonuse of the source address or due to the source address not having been stored or updated within a selectable time interval.

11. A method of monitoring a protected computer network for managing botnet attacks from within the protected computer network, the method comprising:
  receiving a DNS request included in network traffic internal to the protected computer network from a source host included in the protected computer network, each DNS request included in the network traffic including a domain name of a target host and identifying a source address of the source host, wherein translation of the domain name provides an IP address of the source host;
  comparing the domain name of the DNS request to a botnet domain repository, the botnet domain repository including one or more entries, each entry having a confirmation indicator set to confirmed to indicate that the entry is confirmed or set to tentative to indicate that the entry is tentative;
  if determined by the comparison that the domain name of the DNS request is included in the botnet domain repository, then:
    storing or update the source address of the DNS request in an infected host repository, wherein each source address stored in the infected host repository identifies a host known to be infected; and
    outputting a control signal to a network controller to cause the network controller to cause any future network traffic to or from the source address to be diverted to an administrator configured address;
  if determined by the comparison that the domain name is not included in the botnet domain repository, then determining by a second comparison whether the source address of the DNS request is included in the infected host repository; and
  if determined by the second comparison that the source address of the DNS request is included in the infected host repository, then storing the domain of the DNS request in the botnet domain repository having an associated confirmation indicator set to indicate that the source address is tentative, after which the DNS request is allowed to be handled for further processing as intended by the first DNS request.

12. The method of claim 11, further comprising, wherein if determined by the comparison that the domain name of the DNS request is included in the botnet domain repository, sending a DNS response to the DNS request indicating an administrator configured address which will cause the host associated with the source address to send future network traffic to the administrator configured address by using the administrator configured address as the destination address of the future network traffic.

13. The method of claim 11, further comprising if determined by the second comparison that the source address is not included in the infected host repository, then allowing the DNS request to be handled for the further processing as intended by the DNS request.

14. The method of claim 13, wherein allowing the DNS request to be handled for further processing includes forwarding the first DNS request for recursive resolving of the DNS request's domain name into its destination address.

15. The method of claim 12, further comprising when a portion of the future network traffic is received at the administrator configured address due to the destination address of the portion of the future network traffic being the administrator configured address:
  causing generation of a fingerprint of the portion of the future network traffic; and
  causing the fingerprint to be recorded in a fingerprint repository and the portion of the future network traffic to be dropped.

16. The method of claim 15, further comprising when a portion of the network traffic or the future network traffic is received at the administrator configured address due to a diversion to the administrator configured address, causing to be processed as a function of a fingerprint of the network traffic or future network traffic any tentative entry in the botnet domain repository that corresponds to the portion of the network traffic or the future network traffic diverted to the administrator.

17. The method of claim 16, further comprising, when the fingerprint of the portion of the network traffic or the future network traffic diverted to the administrator configured address matches a fingerprint of network traffic that is recorded in the fingerprint repository, causing processing of the corresponding tentative entry in the botnet domain repository includes causing the confirmation indicator of the corresponding tentative entry to be changed from tentative to confirmed.

18. The method of claim 17, further comprising causing to be dropped the portion of the network traffic or the future network traffic diverted to the administrator configured address.

19. The method of claim 16, further comprising, when the fingerprint of the portion of the network traffic or the future network traffic diverted to the administrator configured address does not match fingerprints of network traffic that are recorded in the fingerprint repository a predetermined amount of times, causing the tentative entry in the botnet domain repository to be processed includes causing removal of the corresponding tentative entry from the botnet domain repository, and causing the portion of the network traffic or the future network traffic diverted to the administrator configured address to be handled for further processing as intended by the respective network traffic or future network traffic.

20. The method of claim 11, further comprising periodically updating the infected host repository to remove each source address that is stale due to nonuse of the source address or due to the source address not having been stored or updated within a selectable time interval.

* * * * *